(12) United States Patent
Siegmund et al.

(10) Patent No.: US 8,237,382 B2
(45) Date of Patent: Aug. 7, 2012

(54) LED MODULE AND METHOD FOR OPERATING AT LEAST ONE LED

(75) Inventors: Thomas Siegmund, Otterfing (DE); Adrian Zingalik, Fahrenzhausen (DE)

(73) Assignee: Osram AG, Munich (DE)

( * ) Notice: Subject to any disclaimer, the term of this patent is extended or adjusted under 35 U.S.C. 154(b) by 391 days.

(21) Appl. No.: 12/526,251

(22) PCT Filed: Feb. 13, 2007

(86) PCT No.: PCT/EP2007/051367
§ 371 (c)(1),
(2), (4) Date: Aug. 6, 2009

(87) PCT Pub. No.: WO2008/098613
PCT Pub. Date: Aug. 21, 2008

(65) Prior Publication Data
US 2010/0039045 A1  Feb. 18, 2010

(51) Int. Cl.
*H05B 41/16* (2006.01)
*H05B 41/24* (2006.01)

(52) U.S. Cl. ......... 315/362; 315/224; 315/289; 315/313

(58) Field of Classification Search .................. None
See application file for complete search history.

(56) References Cited

U.S. PATENT DOCUMENTS

| | | | | |
|---|---|---|---|---|
| 5,877,614 A * | 3/1999 | Huber | ........................... | 323/282 |
| 6,430,065 B2 * | 8/2002 | Bucks et al. | ..................... | 363/34 |
| 2005/0047031 A1 | 3/2005 | Naito | | |
| 2005/0110469 A1 | 5/2005 | Inaba et al. | | |
| 2005/0231127 A1 | 10/2005 | Yamamoto et al. | | |
| 2006/0164776 A1 * | 7/2006 | Erdl | ........................... | 361/93.1 |

FOREIGN PATENT DOCUMENTS

| | | |
|---|---|---|
| DE | 36 21 486 | 1/1987 |
| EP | 0 242 022 | 10/1987 |
| EP | 0 285 417 | 10/1988 |
| EP | 0 584 873 | 3/1994 |
| EP | 1 781 072 | 5/2007 |
| WO | WO 99/07187 | 2/1999 |
| WO | WO 2007/049911 | 5/2007 |

* cited by examiner

*Primary Examiner* — Anh Tran
(74) *Attorney, Agent, or Firm* — Cozen O'Connor

(57) ABSTRACT

An LED module (10) for operating at least one LED (18) comprising an input (E1, E2) adapted for coupling to a DC voltage source ($U_E$); an output (A1, A2) adapted for coupling to the at least one LED (18); a filter device (14); and a DC-DC converter (16); wherein the filter device (14) and the DC-DC converter (16) are coupled in series between the input (E1, E2) and the output (A1, A2), and wherein the output (DCA1, DCA2) of the DC-DC converter (16) is coupled to the output (A1, A2) of the LED module (10); wherein the LED module further comprises an electronic switch (Q1), which is configured to couple the DC-DC converter (16) to the input (E1, E2) of the LED module (10) and to decouple it therefrom.

14 Claims, 3 Drawing Sheets ents of different light modules which are coupled to one and the same electronic ballast is varied. As a result, the variation of the switch-on instant increases, that is to say that fewer LED modules switch on simultaneously and the peak value of the cumulative switch-on current again turns out to be lower.

LED MODULE AND METHOD FOR OPERATING AT LEAST ONE LED

RELATED APPLICATIONS

This is a U.S. national stage of application No. PCT/EP2007/051367, filed on Feb. 13, 2008.

FIELD OF THE INVENTION

The present invention relates to an LED module for operating at least one LED comprising an input for coupling to a DC voltage source, an output for coupling to the at least one LED, a filter device; and a DC-DC converter, wherein the filter device and the DC-DC converter are coupled in series between the input and the output, and wherein the output of the DC-DC converter is coupled to the output of the LED module. The invention moreover relates to a circuit arrangement comprising an electronic ballast, and to a method for operating at least one LED using an LED module.

BACKGROUND OF THE INVENTION

The problem area on which the present invention is based can best be discussed with reference to the accompanying FIGS. 1 to 3. Thus, in modern LED lighting systems, use is increasingly being made of a multiplicity of parallel-connected LED modules 10a, 10b, etc., which are operated from a domestic power supply system, which provides the voltage $U_N$, via a central electronic ballast 12. $U_N$ is 230 V AC, for example, in Germany. The electronic ballast 12 provides a voltage $U_E$ at its output, which voltage can be 24 V DC, for example. In this case, the electronic ballast 12 is generally short circuit-proof and equipped with a current monitoring system that triggers in the event of overcurrent. After the removal of a possible short circuit on the secondary circuit the electronic ballast 12 starts up again independently. In order to avoid unintended malfunctions of the system, for example switching off, flicker or periodic flashing during operation, the switch-on current of the parallel-connected LED modules 10a, 10b must not reach the overcurrent switch-off threshold of the electronic ballast 12.

FIG. 2 shows the temporal profile of the input voltage $U_E$ of the light modules 10a, 10b known from the prior art, and also the temporal profile of the input current $I_E$ for a selected one of said light modules 10a, 10b. It is established here that the maximum switch-on current $I_E$ is 300 mA approximately 2.20 ms after switch-on. In continuous operation, the current TE is only 76 mA. On account of this high switch-on current, the maximum permissible number of light modules 10a, 10b operated in parallel from an electronic ballast 12 has to be severely limited.

FIG. 3 shows by way of example in a schematic illustration the construction of one of these LED modules 10 known from the prior art. This LED module comprises an input having a first E1 and a second E2 input terminal. This is followed by a filter device 14 comprising an inductance L1 and a capacitor C1. The filter device 14 has the terminals FE1 and FE2 on the input side and the terminals FA1 and FA2 on the output side. The filter device 14 is followed by a DC-DC converter 16 having input terminals DCE1 and DCE2 and output terminals DCA1 and DCA2. The filter device 14 serves for ensuring high-frequency decoupling between the electronic ballast 12 and the DC-DC converter 16 in order to avoid EMC interference. The output terminals DCA1 and DCA2 simultaneously form the output terminals A1 and A2 of the LED module 10. By way of example, an LED 18 is connected thereto. In this case, the LED 18 can be arranged on the same circuit board as the rest of the circuit, but provision can also be made for leading out the terminals A1, A2 from the circuit board on which the LED module 10 is realized, in order to couple a separately arranged LED 18 to the LED module 10. In this case, the switch-on current $I_E$ is essentially limited by the inductance L1 and the nonreactive resistance of said inductance L1. This furthermore results in the disadvantage that the operating current brings about a voltage drop at the nonreactive resistance of the inductance L1 and, consequently, permanent losses and additional heating occur in the LED module 10.

SUMMARY OF THE INVENTION

One object of the present invention is to provide an LED module of generic type arranged in such a way that a larger number of LED modules can be operated from an electronic ballast than is possible in the prior art. Another object is to provide a corresponding method for operating at least one LED.

These objects are achieved by means of an LED module comprising the features of patent claim 1 and also by means of a method comprising the features of patent claim 13. In accordance with a further aspect of the invention, moreover, a circuit arrangement comprising the features of patent claim 12 is provided.

It is noted that as the input current reaches amplitude values that are all the higher, the lower the input voltage $U_E$ at the instant when the DC-DC converter is switched on. Accordingly, if the input voltage $U_E$ has already increased to higher values before the DC-DC converter is switched on, then a switch-on process distinguished by a significantly lower input current can thereby be realized. As a result, it is then possible for significantly more LED modules to be operated from one and the same electronic ballast. Moreover, the inductance L1 can thus be dimensioned with no consideration for limiting the input current and thus with lower impedance (lower DC resistance), that is to say with lower losses, than in the prior art.

The above-described insight can be realized the most simply in that an LED module according to the invention furthermore comprises an electronic switch, which is designed to couple the DC-DC converter to the input of the LED module and to decouple it therefrom. A delayed switch-on of the DC-DC converter can thus be realized in a simple manner.

A particularly preferred embodiment is distinguished by the fact that it furthermore comprises a timing element, which is designed to bring about switching of the electronic switch that is temporally delayed depending on the amplitude of the signal at the input of the LED module. What can be realized as a result of this is that the electronic switch couples the DC-DC converter to the input of the LED module automatically only when a sufficiently high input voltage is available. The presence of a sufficiently high input voltage subsequently has the consequence that the switch-on current turns out to be comparatively low. Through suitable dimensioning of the timing element, it is thus possible to define when the DC-DC converter is turned on.

Particularly preferably, the time constant of the timing elements of different light modules which are coupled to one and the same electronic ballast is varied. As a result, the variation of the switch-on instant increases, that is to say that fewer LED modules switch on simultaneously and the peak value of the cumulative switch-on current again turns out to be lower.

Preferably, the electronic switch has a control electrode, an operating electrode and a reference electrode wherein the LED module furthermore comprise a voltage divider having a first and a second nonreactive resistor, wherein the series circuit formed by the first and the second nonreactive resistor is coupled in parallel with the input of the LED module. Preferably, in this case the control electrode of the electronic switch is coupled to the junction point between the first and the second nonreactive resistor. The voltage obtained at the voltage divider is thereby utilized for switching the electronic switch on and off.

Preferably, the timing element is realized by at least one capacitor being coupled in parallel with the second nonreactive resistor. As a result, the outlay on additional components becomes minimal.

Two variants of the invention are presented below, these variants differing in where the electronic switch is arranged.

In accordance with a first variant, the electronic switch is coupled between the input of the LED module and the filter device. In this case, it is particularly preferred if the input of the LED module has a first and a second input terminal, wherein the second input terminal is connected to a reference potential, and the filter device has a first and a second filter device input terminal, wherein the first filter device input terminal is coupled to the first input terminal of the LED module, wherein the reference electrode of the electronic switch is coupled to the second input terminal of the LED module, wherein the operating electrode of the electronic switch is coupled to the second filter device input terminal.

Preferably, a first diode is furthermore provided, which is coupled in parallel with the second nonreactive resistor, and is oriented in such a way that it clamps the control electrode of the electronic switch to the potential of the second input terminal. Polarity reversal protection is thereby realized, which prevents the electronic switch from being destroyed in the event of polarity reversal of the voltage $U_E$ on the input side. In normal operation, the diode is operated in the reverse direction and is therefore as it were "invisible".

In the second variant, the electronic switch is coupled between the filter device and the DC-DC converter. Preferably, in this case the DC-DC converter has a first and a second input terminal, the filter device has a first and a second filter device output terminal, wherein the second filter device output terminal is coupled to the reference electrode of the electronic switch, wherein the operating electrode of the electronic switch is coupled to the second input terminal of the DC-DC converter.

Particularly preferably, a first diode is in turn provided, which is coupled in parallel with the second nonreactive resistor, and is oriented in such a way that it clamps the control electrode of the electronic switch to the potential of the second filter device output terminal. This in turn serves as polarity reversal protection, as already discussed above in connection with the first variant.

The preferred embodiments discussed with regard to an LED module according to the invention and their advantages also hold true, if applicable, for the circuit arrangement according to the invention and the method according to the invention for operating at least one LED.

In a particularly preferred embodiment of a circuit arrangement according to the invention, the components of the timing elements of the LED modules have a tolerance of at least 5%, wherein nonreactive resistors of the timing elements have, in particular, a tolerance of 5% and capacitors of the timing elements have, in particular, a tolerance of 10%.

This dimensioning specification makes it possible to ensure, in a particularly simple manner, that the delay until the respective DC-DC converters of different LED modules are switched on differs from one another. The respective maximum switch-on currents therefore occur at different points in time, whereby the maximum switch-on current to be provided by the electronic ballast is reduced further.

BRIEF DESCRIPTION OF THE DRAWINGS

Two exemplary embodiments of an LED module according to the invention will now be described in greater detail below with reference to the accompanying drawings, in which.

DETAILED DESCRIPTION OF THE DRAWINGS

Figure 3:
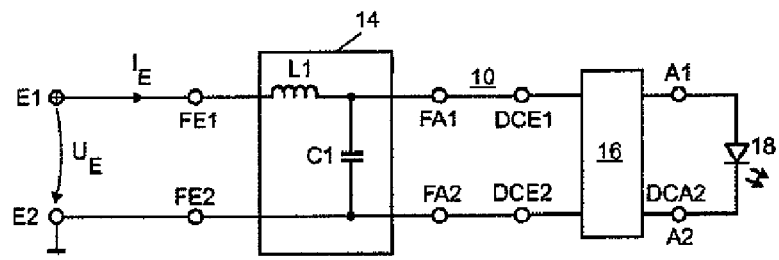
FIG. 3 shows in a schematic illustration the construction of an LED module known from the prior art.
Figure 4A:
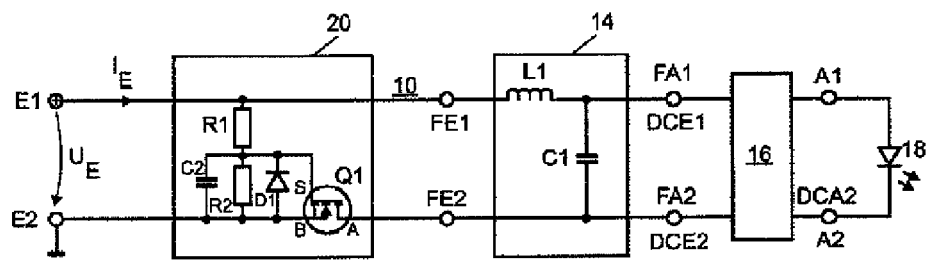
FIG. 4a shows in a schematic illustration the construction of an LED module according to the invention according to a first exemplary embodiment.
Figure 4B:
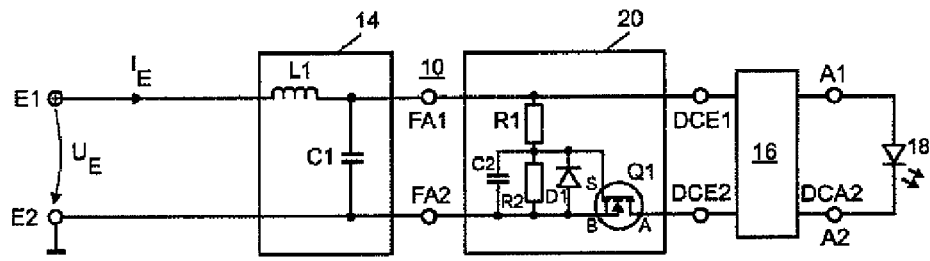
FIG. 4b shows in a schematic illustration the construction of an LED module according to the invention according to a second exemplary embodiment.

The reference symbols introduced with regard to FIG. 3 will continue to be used for the embodiments of an LED module according to the invention as shown in FIGS. 4a and 4b in so far as they relate to identical or similar elements. Therefore, they will not be introduced again.

The embodiment in accordance with FIG. 4a has a block 20 comprising an electronic switch Q1. The control electrode S is connected to the junction point between two nonreactive resistors R1, R2, which form a voltage divider. The reference electrode B of the electronic switch Q1 is coupled to the second input terminal E2 of the LED module 10 and the operating electrode A of the electronic switch Q1 is coupled to the second filter device input terminal FE2. In order to realize a timing element, a capacitor C2 is connected in parallel with the nonreactive resistor R2. A diode D1 clamps the control electrode S of the electronic switch Q1 to the potential of the second input terminal E2. When the supply voltage $U_E$ is switched on, the electronic switch Q1 is initially at high impedance, and the DC-DC converter 16 is therefore not in operation. C2 is charged via R1 slowly with the time constant $\tau=R1*C2$. As soon as the threshold voltage $U_{GS}$ between gate and source of the electronic switch Q1, realized as a MOSFET, for the switch-on of the electronic switch Q1 has been reached, said switch starts to conduct and thus puts the DC-DC converter 16 into operation. In one preferred exemplary realization, R1 is 51 kΩ, R2 is 4.7 kΩ, C2 is 2.2 μF, and an Si2316DS was used as the electronic switch Q1.

In the embodiment in accordance with FIG. 4b, the block 20 is coupled between the filter device 14 and the DC-DC converter 16. In this case, the second filter device output terminal FA2 is coupled to the reference electrode B of the electronic switch Q1, and the operating electrode A of the electronic switch Q1 is coupled to the second input terminal DCE2 of the DC-DC converter 16.

Figure 1:
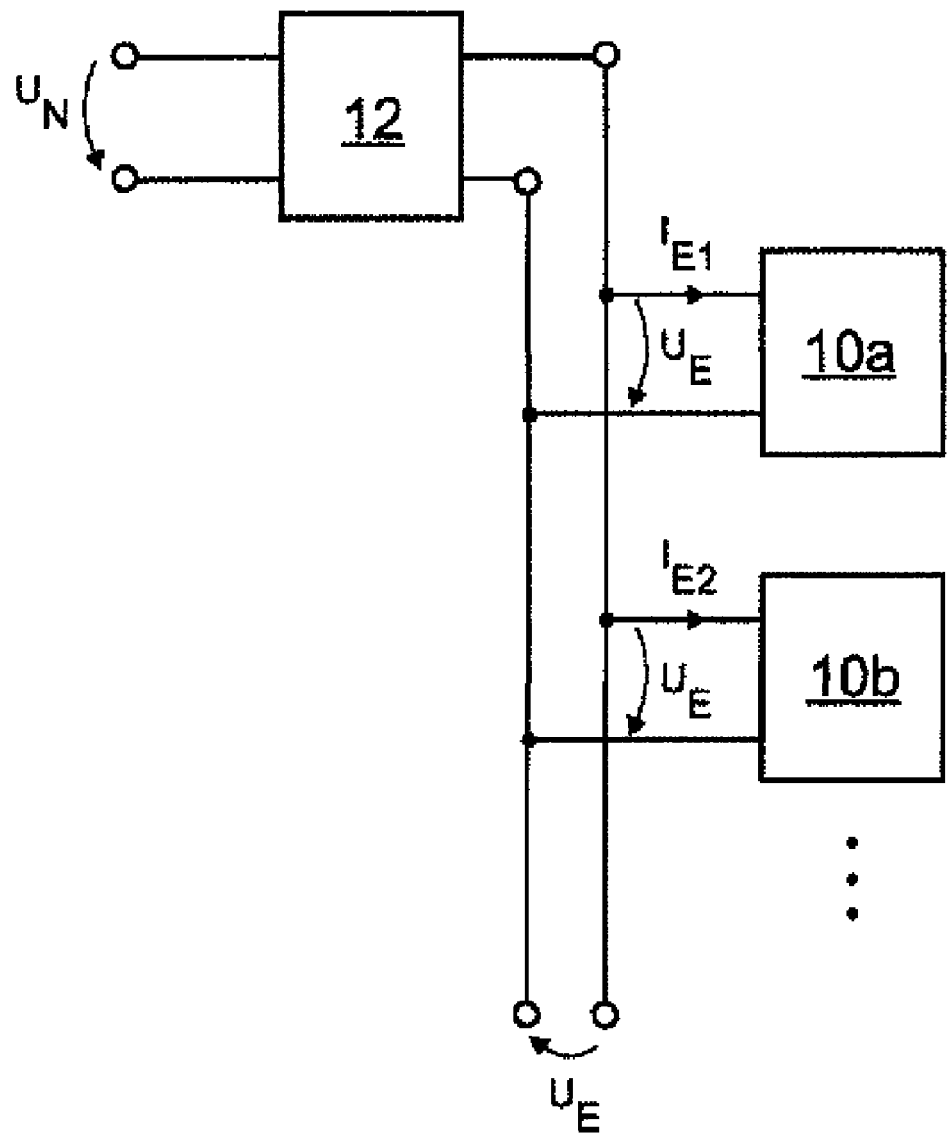
FIG. 1 shows in a schematic illustration a circuit arrangement known from the prior art and comprising an electronic ballast and a plurality of LED modules connected thereto.
Figure 2:
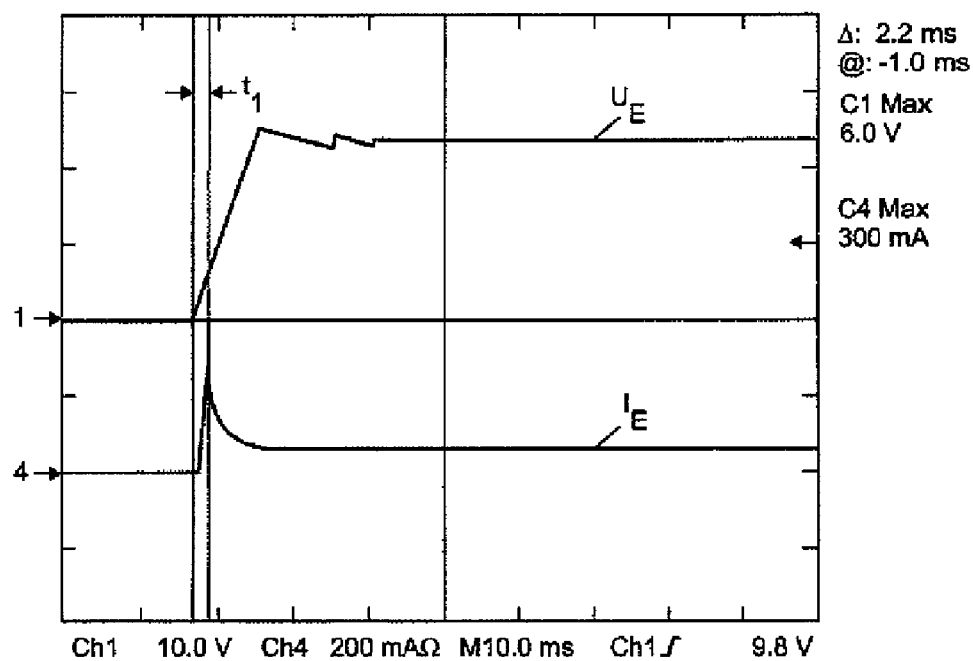
FIG. 2 shows the temporal profile of the input current and of the input voltage for an LED module known from the prior art.
Figure 5:
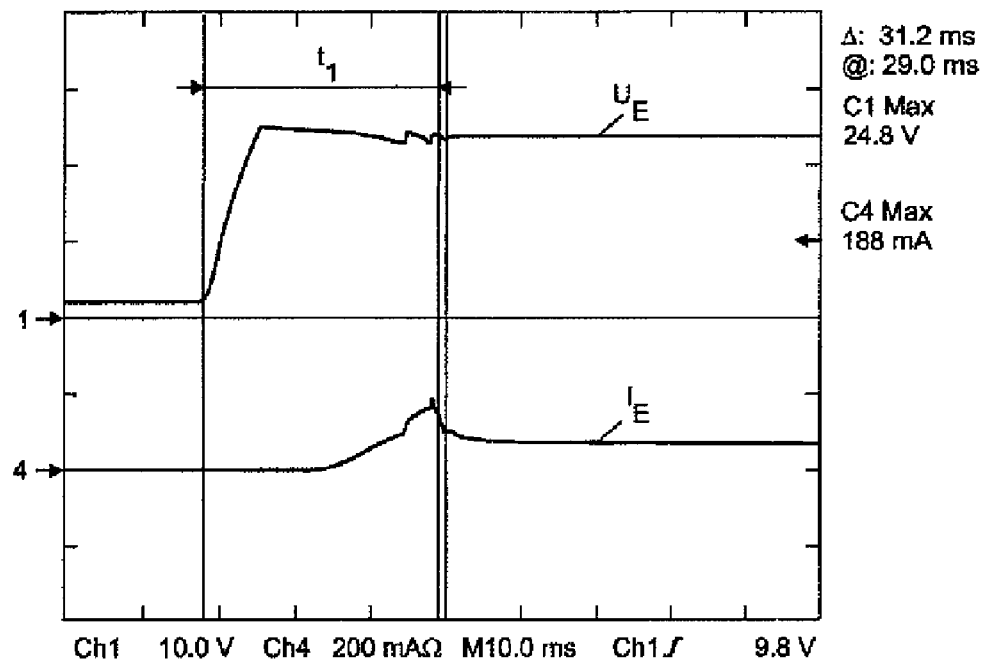
FIG. 5 shows the temporal profile of the input current and of the input voltage for an LED module according to the invention.

Reference will be made below once again to FIG. 2 and for the first time to FIG. 5: in the temporal profile of the input voltage $U_E$, shortly after the rise a first bend can be ascertained. This is the instant that identifies the switch-on of the DC-DC converter 16. The time period $t_1$, identifying the time duration from the switch-on of the LED module 10 until the switch-on of the DC-DC converter 16, is 2.2 ms in FIG. 2, and 31.2 ms in FIG. 5 owing to the delay according to the invention. As a consequence, the amplitude of the maximum switch-on current $I_E$ decreases from 300 mA (see FIG. 2) to 188 mA (see FIG. 5).

A particularly simple variation of the switch-on instant of a plurality of LED modules 10a, 10b operated in parallel from an electronic ballast 12 can be achieved by choosing the components C2 and R1 with a higher tolerance.

After the switch-on, the operating current flows via the low-impedance drain-source path of the turned-on electronic switch Q1. Through a suitable selection of the transistor, for example the resistance $R_{DS\,on}$ of the transistor Si2316DS is approximately 50 mΩ, permanent losses are minimized and, consequently, disadvantageous additional heating is avoided in the LED module.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An LED module for operating at least one LED-comprising
   an input adapted for coupling to a DC voltage source;
   an output adapted for coupling to the at least one LED;
   a filter device; and
   a DC-DC converter;
   wherein the filter device and the DC-DC converter are coupled in series between the input and the output, and wherein the output of the DC-DC converter is coupled to the output of the LED module;
   wherein the LED module further comprises an electronic switch, which is configured to decouple the DC-DC converter from the input of the LED module until an amplitude of a signal at the input of the LED module reaches a determined threshold and to couple the DC-DC converter to the input of the LED module for continuous operation after the signal at the input of the LED module reaches the determined threshold.

2. The LED module as claimed in claim 1,
   further comprising a timing element, which is configured to bring about switching of the electronic switch that is temporally delayed depending on the amplitude of the signal at the input of the LED module.

3. The LED module as claimed in claim 1, wherein the electronic switch has a control electrode, an operating electrode and a reference electrode wherein the LED module further comprises a voltage divider having a first and a second nonreactive resistor, wherein the series circuit formed by the first and the second nonreactive resistor is coupled in parallel with the input of the LED module.

4. The LED module as claimed in claim 3,
   wherein the control electrode of the electronic switch is coupled to the junction point between the first and the second nonreactive resistor.

5. The LED module as claimed in claim 3, wherein at least one capacitor is coupled in parallel with the second nonreactive resistor.

6. The LED module as claimed in claim 1, wherein the electronic switch is coupled between the input of the LED module and the filter device.

7. The LED module as claimed in claim 6,
   wherein the input of the LED module has a first and a second input terminal, wherein the second input terminal is connected to a reference potential,
   wherein the filter device has a first and a second filter device input terminal, wherein the first filter device input terminal is coupled to the first input terminal of the LED module,
   wherein a reference electrode of the electronic switch is coupled to the second input terminal of the LED module, and wherein an operating electrode of the electronic switch is coupled to the second filter device input terminal.

8. The LED module as claimed in claim 7,
   further comprising a first diode, which is coupled in parallel with the second nonreactive resistor, and is oriented in such a way that it clamps the control electrode of the electronic switch to the potential of the second input terminal.

9. The LED module as claimed in claim 1, wherein the electronic switch is coupled between the filter device and the DC-DC converter.

10. The LED module as claimed in claim 9,
    wherein the DC-DC converter has a first and a second input terminal, wherein the filter device has a first and a second filter device output terminal, wherein the second filter device output terminal is coupled to a reference electrode of the electronic switch, and wherein an operating electrode of the electronic switch is coupled to the second input terminal of the DC-DC converter.

11. The LED module as claimed in claim 10,
    further comprising a first diode, which is coupled in parallel with a second nonreactive resistor, and is oriented in such a way that it clamps the control electrode of the electronic switch to the potential of the second filter device output terminal.

12. A circuit arrangement comprising an electronic ballast, wherein the electronic ballast is configured to provide a DC voltage at its output,
    wherein a parallel circuit formed by at least two LED modules is coupled to the output of the electronic ballast, each of the LED modules comprising:
    an input adapted for coupling to a DC voltage source;
    an output adapted for coupling to the at least one LED;
    a filter device; and
    a DC-DC converter;
    wherein the filter device and the DC-DC converter are coupled in series between the input and the output, and wherein the output of the DC-DC converter is coupled to the output of the LED module;
    wherein the LED module further comprises an electronic switch, which is configured to couple the DC-DC converter to the input of the LED module and to decouple it therefrom, and the LED module further comprises a timing element,
    wherein the timing elements of the at least two LED modules are configured to provide a different delay time to each of the at least two LED modules.

13. The circuit arrangement as claimed in claim 12,
    wherein components of the timing elements of the LED modules have a tolerance of at least 5%, wherein nonreactive resistors of the timing elements have a tolerance of 5% and capacitors of the timing elements have a tolerance of 10%.

14. A method for operating at least one LED using an LED module comprising an input for coupling to a DC voltage source; an output for coupling to the at least one LED; a filter device; and a DC-DC converter; wherein the filter device and the DC-DC converter are coupled in series between the input and the output, and wherein the output have the DC-DC converter is coupled to the output of the LED module;

wherein the method comprises the steps of:

a) coupling the DC voltage source to the input of the LED module; and b) coupling the DC-DC converter to the input of the LED module in temporally delayed fashion relative to step a), wherein the DC-DC converter is decoupled from the input of the LED module until an amplitude of a signal at the input of the LED module reaches a determined threshold, and the DC-DC converter is coupled to the input of the LED module for continuous operation after the signal at the input of the LED module reaches the determined threshold.

* * * * *